(12) United States Patent
Brunn et al.

(10) Patent No.: US 10,541,950 B2
(45) Date of Patent: *Jan. 21, 2020

(54) FORMING A GROUP OF USERS FOR A CONVERSATION

(71) Applicant: International Business Machines Corporation, Armonk, NY (US)

(72) Inventors: Jonathan F. Brunn, Logan, UT (US); Jennifer Heins, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 553 days.

This patent is subject to a terminal disclaimer.

(21) Appl. No.: 15/146,659

(22) Filed: May 4, 2016

(65) Prior Publication Data

US 2016/0323545 A1 Nov. 3, 2016

Related U.S. Application Data

(63) Continuation of application No. 14/701,058, filed on Apr. 30, 2015, now Pat. No. 10,263,922.

(51) Int. Cl.
*H04N 7/15* (2006.01)
*H04L 29/08* (2006.01)
(Continued)

(52) U.S. Cl.
CPC .......... *H04L 51/04* (2013.01); *H04L 12/1822* (2013.01); *H04L 65/1069* (2013.01);
(Continued)

(58) Field of Classification Search
CPC ......... H04L 51/32; H04L 65/60; H04L 12/18; H04L 12/1813; H04M 3/567; H04M 2215/208

See application file for complete search history.

(56) References Cited

U.S. PATENT DOCUMENTS

| 5,594,859 A | 1/1997 | Palmer et al. |
| 7,003,795 B2 | 2/2006 | Allen |

(Continued)

FOREIGN PATENT DOCUMENTS

| EP | 1449369 B1 | 12/2010 |
| WO | 2012061318 | 5/2012 |
| WO | 2013052923 | 4/2013 |

OTHER PUBLICATIONS

List of IBM Patents or Patent Applications Treated as Related; May 4, 2016.

(Continued)

*Primary Examiner* — Romani Ohri
(74) *Attorney, Agent, or Firm* — Fabian VanCott; Steven L. Nichols (57) ABSTRACT

Forming a group of users for a conversation includes determining when users are accessing information associated with each other, maintaining a group of the users, the group of the users representing a transitive closure over a viewing relationship of the information, displaying, via a display of a user device, digital representations of the users in the group accessing the information, and initiating, based on an action of at least one of the users in the group of users, a conversation.

20 Claims, 6 Drawing Sheets

(51) Int. Cl.
*H04L 29/06* (2006.01)
*H04L 12/58* (2006.01)
*H04L 12/18* (2006.01)

(52) U.S. Cl.
CPC .......... *H04L 65/403* (2013.01); *H04L 67/306* (2013.01); *H04N 7/152* (2013.01); *H04N 7/157* (2013.01)

(56) References Cited

U.S. PATENT DOCUMENTS

| | | |
|---|---|---|
| 7,822,745 B2 | 10/2010 | Fayyad et al. |
| 8,135,800 B1 | 3/2012 | Walsh et al. |
| 8,484,478 B2 | 7/2013 | Kent, Jr. et al. |
| 8,630,968 B2 | 1/2014 | Sinha |
| 8,639,229 B2 | 1/2014 | Apfel et al. |
| 8,656,288 B2 | 2/2014 | Roger et al. |
| 8,707,184 B2 | 4/2014 | Chen et al. |
| 8,756,278 B2 | 6/2014 | Sittig et al. |
| 8,812,499 B2 | 8/2014 | Sathish et al. |
| 8,825,778 B2 | 9/2014 | DeLuca et al. |
| 2007/0053308 A1 | 3/2007 | DuMas et al. |
| 2008/0141146 A1 | 6/2008 | Jones et al. |
| 2010/0110160 A1 | 5/2010 | Brandt et al. |
| 2011/0016479 A1 | 1/2011 | Tidwell et al. |
| 2011/0282732 A1 | 11/2011 | Bax et al. |
| 2011/0307791 A1 | 12/2011 | Pierre et al. |
| 2012/0124139 A1 | 5/2012 | Dempski |
| 2012/0268553 A1* | 10/2012 | Talukder ............. H04L 12/1818 348/14.08 |
| 2013/0263021 A1* | 10/2013 | Dunn .................. H04L 12/1827 715/756 |
| 2013/0268377 A1* | 10/2013 | Jessup ................ G06Q 30/0605 705/14.73 |
| 2014/0040761 A1 | 2/2014 | Liu et al. |
| 2014/0313282 A1* | 10/2014 | Ma ......................... H04N 7/152 348/14.09 |
| 2015/0256796 A1* | 9/2015 | Ma ........................... H04N 7/15 709/206 |
| 2016/0189407 A1* | 6/2016 | Hodgson ................. G06T 11/60 715/204 |

OTHER PUBLICATIONS

Peddinti et al; Cloak and Swagger: Understanding Data Sensitivity Through the Lens of User Anonymity; Polytechnic School of Engineering; 35th IEEE Symposium on Security and Privacy; pp. 1-16; May 2014.

Savage et al; Visualizing Targeted Audiences; University of California; Coop 2014—Proceedings of the 11th International Conference on the Design of Cooperative Systems; www.cs.ucsb.edu/~holl/pubs/Savage-2014-COOP.pdf; pp. 1-16; Jun. 2014.

List of IBM Patents or Patent Applications Treated as Related; Dec. 21, 2016.

* cited by examiner

FORMING A GROUP OF USERS FOR A CONVERSATION

BACKGROUND

The present description relates to forming a group of users, and more specifically, to forming the group of the users for a conversation.

Allowing users to work remotely is a growing trend due to flexible work locations, hours, and an expanding global workforce. Often, a user needs to initiate conversations during the work day with other users, such as colleagues, to answer questions and collaborate on projects. The user may initiate a conversation as an instant message (IM), an electronic mail (email), a live video, audio, or a short message service (SMS).

BRIEF SUMMARY

A method for forming a group of users for a conversation includes determining when users are accessing information associated with each other, maintaining a group of the users, the group of the users representing a transitive closure over a viewing relationship of the information, displaying, via a display of a user device, digital representations of the users in the group accessing the information, and initiating, based on an action of at least one of the users in the group of the users, a conversation.

A system for forming a group of users for a conversation includes an information determining engine to determine when users are accessing information associated with each other, a detecting engine to detect when each of the users is in front of an audio-video device, the audio-video device being in communication with a user device, a user preference determining engine to determine user preferences for each of the users, a maintaining engine to maintain a group of the users, the group of the users representing a transitive closure over a viewing relationship of the information, a displaying engine to display, via a display of the user device, digital representations of the users in the group accessing the information, and an initiating engine to initiate, based on an action of at least one of the users in the group of the users, a conversation.

A machine-readable storage medium encoded with instructions for forming a group of users for a conversation, the instructions executable by a processor of a system to cause the system to maintain a group of users, the group of the users representing a transitive closure over a viewing relationship of information, display, via a display of a user device, digital representations of the users in the group accessing information, and initiate, based on an action of at least one of the users in the group of the users, a conversation.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for forming a group of users for a conversation, such that instant video presence and awareness is enabled for the conversation in a non-invasive manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a user needs to initiate conversations during the work day with other users, for example co-workers, colleagues, customers, etc. Such conversations may be held, for example, to answer questions or collaborate on projects. Often, the user schedules a video conference for an exchange about a specific topic. To schedule a video conference, the user may specify a time, a date, and a specific topic for the video conference. Further, the user invites other users to join the video conference. To invite the other users, the user manually specifies the other users that are allowed to join the video conference or sends a uniform resource locator (URL) link or password to the other users to grant them access to the video conference.

While a user can initiate a conversation via a video conference, the video conference is typically planned in advance and is not spontaneous. This results in a reduction in personal interaction and spontaneity. The video conference is planned in advance, is limited to specific users, and often focuses on a specific topic.

Some tools allow ad-hoc video sharing and creation of virtual rooms on demand when one user initiates a conversation with one or more users. Even in these cases, users are invited to the conversation or must subscribe to a channel, a tag, a community or other virtual place to become aware of the conversation and join the conversation. As a result, if the users are not invited to the conversation or subscribed as described above, the users are unaware of the conversation.

The principles described herein include a method for forming a group of users for a conversation. Such a method includes determining when users are accessing information associated with each other, maintaining a group of the users, the group of the users representing a transitive closure over a viewing relationship of the information, displaying, via a display of a user device, digital representations of the users in the group accessing the information, and initiating, based on an action of at least one of the users in the group of the users, a conversation. Such a method allows a user to view other users who are looking at information associated with them. As a result, the method enables instant video presence and awareness in a non-invasive manner. This allows users to continue their work if they choose not to interact, but at the same time be aware of the other users and the potential interactions in any moment.

In the present specification and in the appended claims, the term "user" means an individual who are capable of accessing, via a user device, information associated with another user. A user may be a single individual. A user may be a group of users such as an organization.

In the present specification and in the appended claims, the term "information" means data associated with a user. The information may be a document, a profile, a profile card, other information, or combinations thereof.

In the present specification and in the appended claims, the term "digital representation" means a symbolic depiction of a user. The digital representation may be a live video, a name, an avatar, or an image of the user.

In the present specification and in the appended claims, the term "transitive closure" means a number of users in a connected component of a graph data structure. If user A is viewing information associated with user B, user B is viewing information associated with user C, then user A, user B, and user C are users in a connected component in a graph data structure.

In the present specification and in the appended claims, the term "viewing relationship" means an association between at least two users when at least one of the two users is accessing information associated with the other user. The viewing relationship may be depicted in a graph data structure as an edge connecting the two nodes together, each of the nodes representing one of the users.

In the present specification and in the appended claims, the term "graph data structure" means a mechanism to maintain a viewing relationship of users viewing information associated with each other. The graph data structure may include connected components. The connected components may be a set of nodes in the graph data structure. Each of the nodes may represent a user. Further, edges in the graph represent a viewing action from one user on another uses and labeled is with information about the viewing action including the time the viewing action was taken. The users, represented as nodes in the connected component from a group of users. Further, a graph data structure can have many connected components. Modifying the properties or label of an edge in the graph data structure notes communication has occurred. Further, the graph data structure may be modified by removing edges labeled with dates older than a certain threshold.

In the present specification and in the appended claims, the term "graph display" means a mechanism to display a number of digital representations of users. The graph display may be a sidebar displayed on a display of a user device. Further, the graph display includes a number of digital representations of users and icons.

In the present specification and in the appended claims, the term "action" means a command from a user to initiate a conversation. An action may include clicking on a digital representation to initiate a conversation.

In the present specification and in the appended claims, the term "conversation" means online communication between at least two users. A conversation may be initiated as an instant message (IM), an electronic mail (email), a video, audio, a short message service (SMS), or combinations thereof.

In the present specification and in the appended claims, the term "profile" means a visual display of personal data associated with a user. A profile may be an explicit representation of a user's identity. The profile may be stored on a website, a social network, a database, or other locations capable of storing profiles in an electronic form.

In the present specification and in the appended claims, the term "document" means an electronic manuscript authored by a user. The document may be stored on a website, a social network, a database, or other locations capable of storing documents in an electronic form.

In the present specification and in the appended claims, the term "profile card" means a mechanism to identify a user. The profile card may be similar to a business card, but stored in electronic form. Further, a profile card may be a user's name displayed in electronic form. The profile card or a reference to a profile card may be stored on a website, a social network, a database, or other locations capable of storing profile cards in an electronic form.

In the present specification and in the appended claims, the term "user preferences" means data specified by a user that is specific to the user. User preference may include if a conversation is initiated in private space or public space.

In the present specification and in the appended claims, the term "information storage facility" means a collection of websites, databases, and social networks that stores information associated with a number of users. The websites, databases, and social networks may be implemented on a number of servers. As a result, an information storage facility may include a collection of servers storing information associated with users.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
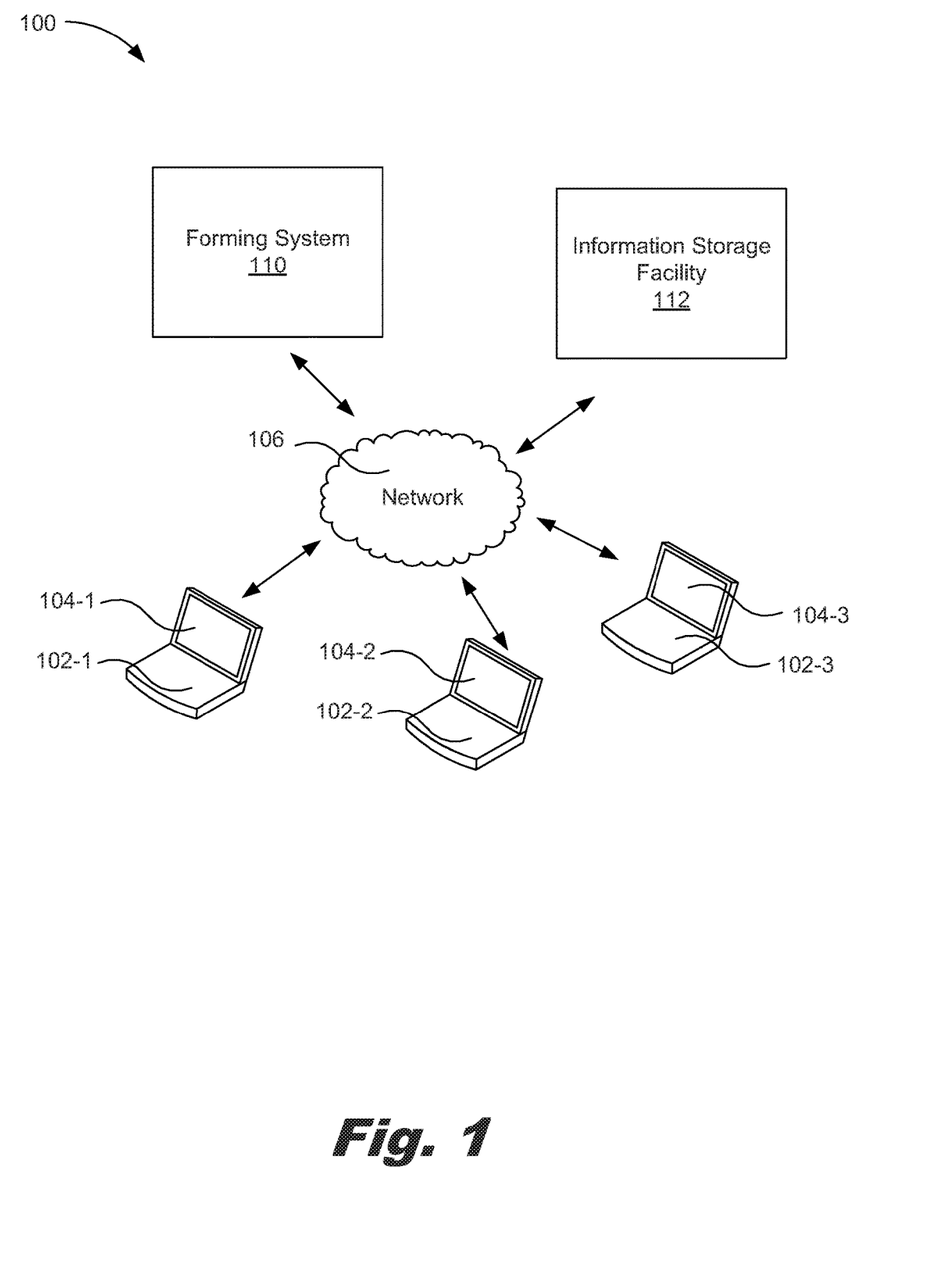
FIG. 1 is a diagram of an example of a system for forming a group of users for a conversation, according to one example of principles described herein.

Referring now to the figures, FIG. 1 is a diagram of an example of a system for forming a group of users for a conversation, according to one example of principles described herein. As will be described below, a forming system is in communication with a network to determine when users are accessing information associated with each other. The forming system maintains a group of the users, the group of the users representing a transitive closure over a viewing relationship of the information. Further, the forming system displays, via a display of the user device, digital representations of the users in the group accessing the information. Further, the forming system initiates, based on an action of at least one of the users in the group of the users, a conversation.

As illustrated, the system (100) includes an information storage facility (112). The information storage facility (112) may include a collection of websites, databases, and social networks that stores information associated with a number of users. The websites, databases, and social networks may be implemented on a number of servers. As a result, an information storage facility (112) may include a collection of servers storing information associated with the users. The information may include a profile associated with at least one of the users, a document associated with at least one of the users, a profile card associated with at least one of the users, or combinations thereof.

In one example, the system (100) includes user devices (102) with displays (104). The user devices (102) may allow users to access the information storage facility (112). Further, the user devices (102) may allow the users to initiate conversations with each other. More information about the user devices (102) will be described in other parts of this specification.

The system (100) further includes a forming system (110). The forming system (110) may be in communication with the user devices (102) and the information storage facility (112) over the network (106).

The forming system (110) determines when users are accessing information associated with each other. As mentioned above, the information may be stored on the information storage facility (112).

Further, the forming system (110) maintains a group of the users, the group of the users representing a transitive closure over a viewing relationship of the information. As long as a user continues to access information associated with another user or in the absence of further action to initiate a conversation, for a defined period of time after the initial access, a node associated with the user is connected, via an edge, in the graph data structure to another node such as the user whose information is being viewed. In one example, the forming system (110) maintains labels on the graph data structure's edges indicating a time that the user accessed the information. Edges labeled before a period of time in the past are pruned or ignored when computing connected components of the graph data structure.

Further, the forming system (110) further displays, via a display of the user device (102), digital representations of the users in the group accessing the information. The digital representations includes a live video of each of the users in the group, a name for each of the users in the group, an avatar for each of the users in the group, or an image for each of the users in the group.

Further, the forming system (110) initiates, based on an action of at least one of the users in the group of the users, a conversation. The conversation may be initiated in public space or in private space. In one example, the action to initiate a conversation changes the label on the graph data structure's edge to note communication has occurred and other metadata about the conversation, such as the time or a reference to the content of the conversation. As a result, the method enables instant video presence and awareness in a non-invasive manner. This allows users to continue their work if they choose not to interact, but at the same time be aware of the other user and the potential interactions in any moment. More information about the forming system (110) will be described later on in this specification.

While this example has been described with reference to the forming system being located over the network, the forming system may be located in any appropriate location according to the principles described herein. For example, the forming system may be located in a user device, a server, a datacenter, other locations, or combinations thereof.

Figure 2:
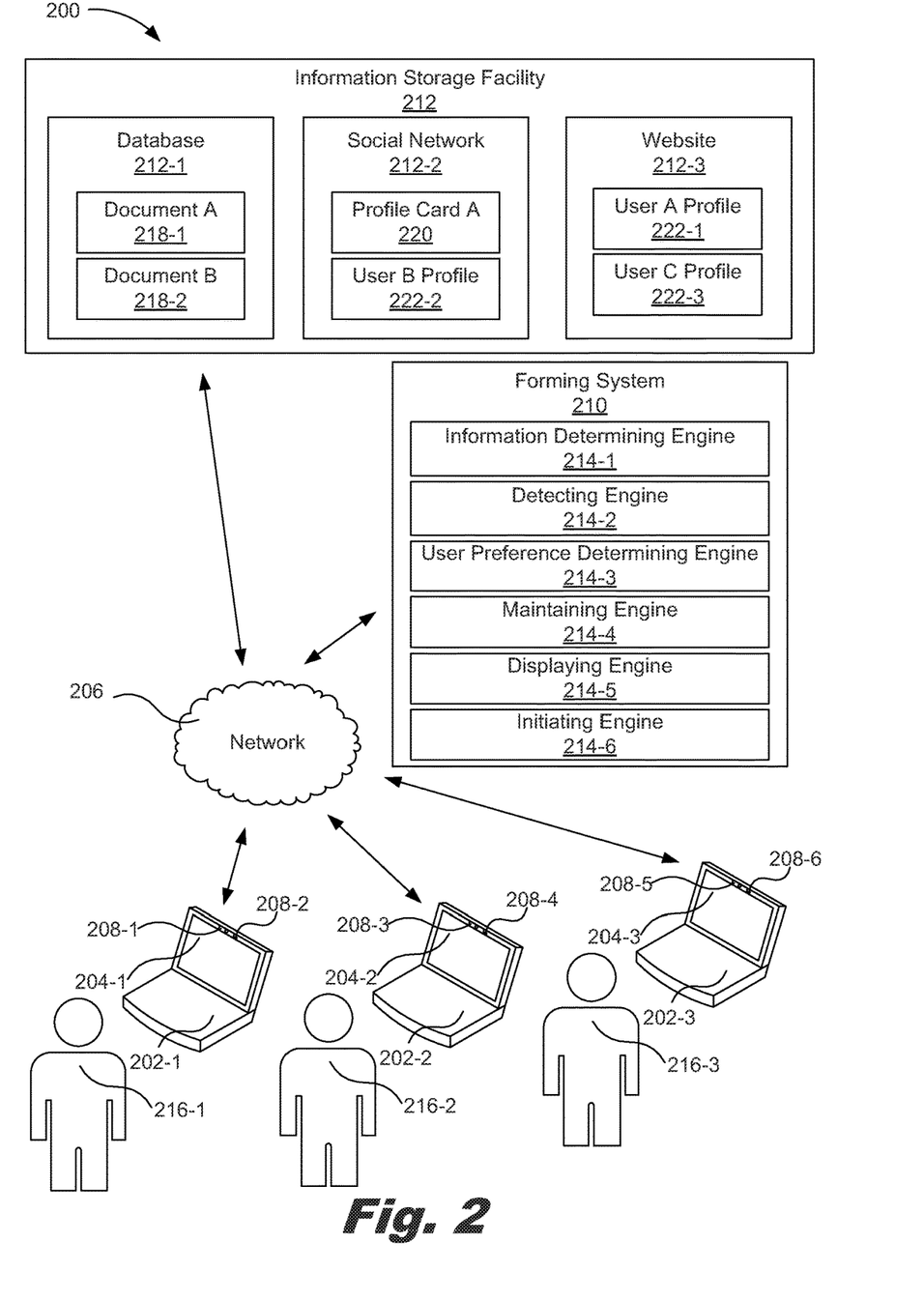
FIG. 2 is a diagram of an example of a system for forming a group of users for a conversation, according to one example of principles described herein.

FIG. 2 is a diagram of an example of a system for forming a group of users for a conversation, according to one example of principles described herein. As will be described below, a forming system is in communication with a network to determine when users are accessing information associated with each other. The forming system maintains a group of the users, the group of the users representing a transitive closure over a viewing relationship of the information. Further, the forming system displays, via a display of the user device, digital representations of the users in the group accessing the information. Further, the forming system initiates, based on an action of at least one of the users in the group of the users, a conversation.

As illustrated, the system (200) includes an information storage facility (212). The information storage facility (212) includes information associated with users (216). The information storage facility (212) may include a database (212-1). The database (212-1) may store document A (218-1) and document B (218-1) in an electronic form. Document A (218-1) may be associated with user A (216-1). Document B (218-2) may be associated with user B (216-2).

Further, the information storage facility (212) may include a social network (212-2). The social network (212-2 includes profile card A (220) and user B profile (222-2). Profile card A (220) may be associated with user A (216-1). User B profile (222-2) may be associated with user B (216-2).

Further, the information storage facility (212) may include a website (212-3). The website (212-3) includes user A profile (222-1) and user C profile (222-3). User A profile (222-1) may be associated with user A (216-1). User C profile (222-3) may be associated with user C (216-3).

While this example has been described with reference to the information storage facility including a database, a social network, and a website, the information storage facility may include other forms of storing and accessing information associated with a user. For example, the information storage facility may include a server, a universal serial bus (USB) drive, or a hard drive disk (HDD) that allows users to store and access information associated with other users.

As illustrated, the system (200) includes user devices (202) with displays (204). The system (200) includes user device A (202-1). User device A (202-1) includes a number of features. The features include display A (204-1), camera A (208-1), and microphone A (208-2). Further, user device A (202-1) may be associated with user A (216-1). As a result, if user device A (202-1) is accessing the information storage facility (212), a forming system (210) determines user A (216-1) is accessing the information on the information storage facility (212).

Similarly, the system (200) includes user device B (202-2). User device B (202-2) includes a number of features. The features include display B (204-2), camera B (208-3), and microphone B (208-4). Further, user device B (202-2) may be associated with user B (216-2). As a result, if user device B (202-2) is accessing the information storage facility (212), the forming system (210) determines user B (216-2) is accessing the information on the information storage facility (212).

Further, the system (200) includes user device C (202-3). User device C (202-3) includes a number of features. The features include display C (204-3), camera C (208-5), and microphone C (208-6). Further, user device C (202-3) may be associated with user C (216-3). As a result, if user device C (202-3) is accessing the information storage facility (212), the forming system (210) determines user C (216-3) is accessing the information on the information storage facility (212).

Further, the user devices (202) may allow the users to initiate conversations with each other. As will be described in other parts of this specification the viewing relationship of the information for the group of the users is tracked via a graph data structure, the graph data structure includes nodes and edges as described above.

The system (200) further includes a forming system (210). In one example, the forming system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the forming system (210) includes an information determining engine (214-1), a detecting engine (214-2), a user preference determining engine (214-3), a maintaining engine (214-4), a displaying engine (214-5), and an initiating engine (214-6).

The forming system (210) may be implemented entirely within a single application or product. Further, a user interface (UI) of the forming system (210) may be contained entirely in a browser. The forming system (210) may also be implemented as part of an operating system, including a mobile operating system.

The information determining engine (214-1) determines when users (216) are accessing information associated with each other. If user A (216-1) uses user device A (202-1) to access user B profile (222-2) on the information storage facility (212), the information determining engine (214-1) determines user A (216-1) is accessing information associated with user B (216-2). Further, if user B (216-1) uses user device B (202-2) to access profile card A (220) on the information storage facility (212), the information determining engine (214-1) determines user B (216-2) is accessing information associated with user A (216-1). Profile card A (220) does not explicitly need a user action to open it. Profile card A (220) may appear in various embedded contexts such as in an online document editor where multiple editors can see each other editing live. Further, profile card A (220) may appear on a document, a blog, or a post to identify the user who is the author. In some examples, viewing a document may be enough to trigger the forming system's behavior between the user viewing the document and the user who is the author of the document.

The detecting engine (214-2) detects when each of the users are in front of an audio-video device, the audio-video device being in communication with a user device. The audio-video device may include a camera, a microphone, or other audio-video device. For example, the detecting engine (214-2) may detect when user A (216-1) is in front of camera A (208-1). The detecting engine (214-2) may detect when user B (216-2) is in front of camera B (208-3). Further, the detecting engine (214-2) may detect when user C (216-3) is in front of camera C (208-5). The detecting engine (214-2) may use various methods and techniques to detect when each of the users (216) are in front of the cameras (208-1, 208-3, 208-5). In some examples, once the user is in front of the camera, the user's live video is made constantly available in their profile card or user profile.

The user preference determining engine (214-3) determines user preferences for each of the users. For example, the user preference determining engine (214-3) determines user preferences for user A (216-1). The user preference determining engine (214-3) determines user preferences for user B (216-2). The user preference determining engine (214-3) determines user preferences for user C (216-3). A UI of the forming system (210) may allow the users (216) to specify the user preferences.

The user preferences may include allowing a specific network or group of users to view live video of the user as a digital representation of the user. The user preferences may include allowing a specific network or group of users to view a standard image of the user as a digital representation of the user.

Further, the user preferences may include a time threshold. The time threshold may be in terms of minutes or seconds. The time threshold may determine a duration of time that a digital representation of another user may be displayed in a graph display after a user is no longer viewing information associated with another user. If user A (216-1) specifies a time threshold of thirty seconds and just stopped accessing user B profile (222-2), a digital representation of user B (216-1) is still displayed in user A's graph display until the thirty seconds has expired.

The maintaining engine (214-4) maintains a group of the users, the group of the users representing a transitive closure over a viewing relationship of the information. As long as user A (216-1) is accessing information associated with user B (216-2) or in a conversation with user B (216-2), a digital representation of user B (216-1) is displayed on user device A (202-1) via display A (204-1). As a result, an edge in the graph data structure shows this viewing relationship. However, once user A (216-1) is no longer accessing information or has terminated the conversation associated with user B (216-1) and a time threshold has expired, the digital representation of user B (216-1) is not displayed on user device A (202-1) via display A (204-1). This results in the edge in the graph data structure to be pruned. As a result, the maintaining engine (214-4) is constantly adjusting the group of the users depending on if the users are accessing information associated with each other or not.

The displaying engine (214-5) displays, via a display of the user device, digital representations of the users in the group accessing the information. For example, if user A (216-1) is accessing user B profile (222-2), the displaying engine (214-5) displays, via a display A (204-1) of user device A (202-1), a digital representations of users B (216-2) as a graph display. Further, the displaying engine (214-5) displays, via a display B (204-2) of user device B (202-2), a digital representation of users A (216-1) as a graph display. As a result, both user A (216-1) and user B (216-2) have instance video presence of each other. In this example, the group of the users is user A (216-1) and user B (216-2).

If user A (216-1) is accessing user B profile (222-2) and user C profile (222-3), the displaying engine (214-5) displays, via a display A (204-1) of user device A (202-1), a digital representations of users B (216-2) and user C (216-3). However, the displaying engine (214-5) displays, via a display B (204-2) of user device B (202-2), a digital representation of users A (216-1) as a graph display. Further, the displaying engine (214-5) displays, via a display C (204-3) of user device C (202-3), a digital representation of users A (216-1) as a graph display. As a result, user A (216-1) has instance video presence of user B (216-2) and user C (216-1). However, user B (216-2) and user C (216-1) have instance video presence of user A (216-1) only. As a result, the users in the group of the users become participants in a multi-person video share. Further, the users in the group of the user may be initially muted until an action is taken to initiate a conversation.

The digital representations of the users (216) may include a live video of each of the users in the group of the users. The live video may be generated via the cameras (208-1, 208-3, 208-5) of the user devices (202).

Further, the digital representations of the users (216) may include a name for each of the users in the group of the users. The name may be specified by a user via the user preferences.

The digital representations of the users (216) may include an avatar for each of the users in the group of the users. The avatar may be specified by a user via the user preferences.

Further, the digital representations of the users (216) may include an image for each of the users in the group. The image may be specified by a user via the user preferences.

The initiating engine (214-6) initiates, based on an action of at least one of the users in the group of the users, a conversation. The conversation may be initiated in public space or in private space. The conversation may be initiated in public space or in private space as specified by the user preferences for each user. If user A specifics all conversations with user B are to be initiated in private space, all conversations with user B are initiated in private space. As a result, all other conversations with other users are initiated in public space. Further, the conversation may be initiated as an IM, an email, a live video, audio, a SMS, or combinations thereof.

Further, if neither user in the group of the users takes an action within the group in a set period of time, the relationship is closed and the graph data structure adjusted. If either of the users in the group of users takes action to initiate a conversation with a third user of the group of users, this would form a new group of users in the graph data structure. However, the groups of the users exist as connected components of the graph data structure regardless of the user initiating communication. The initiated communication keeps the user in the connected component of the graph data structure by keeping the edge in the graph data structure for a longer duration of time. Consequently, the group of the users may be constantly changing based on users accessing information associated with other users until a user takes an action to initiate a conversation.

In one example, two large groups of users may be communicating amongst themselves in two conversations. One user from one of the groups of the users may access information associated with another user from another group of the users. For a few seconds, all the users of both groups may view digital representations of all the users from the other group. Further, depending on user preferences and what communication occurs, both groups may be joined into the same chat session, video conference or call. Further, any user of either group may view digital representations of all users of both groups for a short time and decide to initiate a conversation with everyone.

An overall example of FIG. 2 will now be described. The information determining engine (214-1) determines when users are accessing information associated with each other. For example, user A (216-1) is accessing user B profile (222-2) and user B (216-1) is accessing document A (218-2). The detecting engine (214-2) detects when each of the users are in front of an audio-video device, the audio-video device being in communication with a user device. The detecting engine (214-2) detects when user A (216-1) is in front of camera A (208-1) and when user B (216-2) is in front of camera B (208-3). The user preference determining engine (214-3) determines user preferences for user A (216-1) and user B (216-2). The maintaining engine (214-4) maintains the group of the users for user A (216-1) and user B (216-2) as long as at least one of the user is accessing information associated with the other user. The displaying engine (214-5) displays, via display A (204-1) and display B (204-2) of user device A (202-1) and user device B (202-2) respectively, digital representations of user A (216-1) and user B (216-2). The initiating engine (214-6) initiates, based on an action of at least one of the users in the group of the users, a conversation. For example, user A (216-1) may click on the digital representation of user B (216-2) to initiate a conversation.

Figure 3:
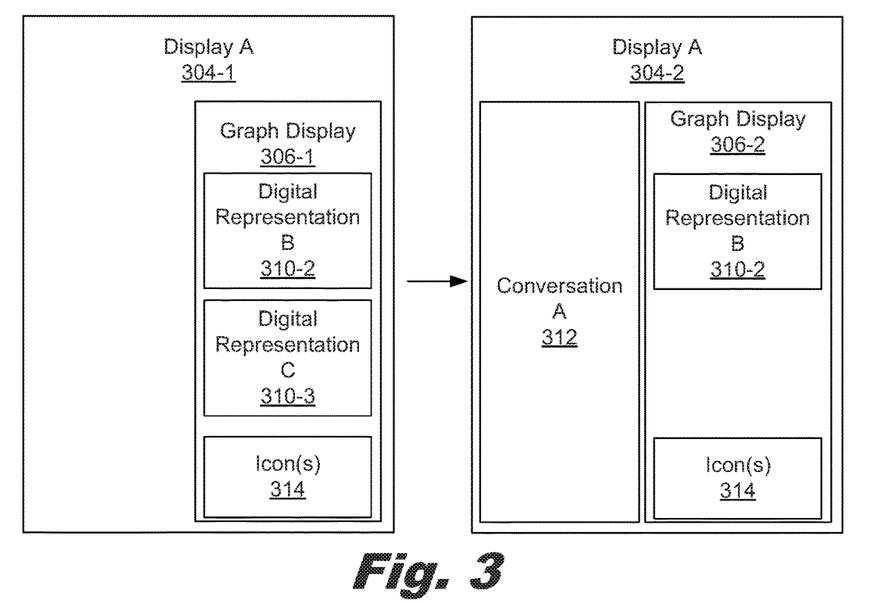
FIG. 3 is an example of a display for displaying a conversation, according to one example of principles described herein.

FIG. 3 is an example of a display for displaying a conversation, according to one example of principles described herein. As mentioned above, the forming system enables transitive presence awareness among users accessing information associated with each other. As a result, users do not need to be invited to an online room for a conversation because online rooms are dynamically formed by the transitive closure of users viewing each other online.

Turning to FIG. 3, display A (304) may be displayed on user device A for user A as described above. As will be described below, display A (304) may display a graph display (306). The graph display (306) may include a number of digital representations (310) of users, icons (314). The icons (314) may include an unmute button. When a user selects the unmute button, a conversation may be initiated or the user may join an ongoing conversation if one exists for the current connected group. Further, display A (304) may display conversation A (312).

In one example, user A accesses user B's profile card as described above. Both user A and user B have instant video presence with each other. As a result, the graph display (306-1) includes digital representation B (310-2). Digital representation B (310-2) may be a live video of user B. As a result, user A views user B on the graph display (306-1) and user A can continue doing what they are doing in a main window of display A (304-1). Further, both user A and user B can ignore each other and not interact any further if they desired.

Although not illustrated, user B sees that user A is looking for him via a graph display displayed on display B. In this example, user A's live video is shown in a graph display for user B. Further, user B can continue what they are doing in a main window of the display B.

Further, the graph display (306-1) can be minimized, but will open or become highlighted when a new user enters. For example, if user C is accessing information associated with user A, a digital representation of user C, such as digital representation C (310-3), may be highlighted in the graph display (306-1).

If user A takes an action, such as clicking on user B in the graph display (306-2), conversation A (312) is displayed in display A (304-2). This also unmutes user A's microphone on user device A since user A has taken an action to engage with user B in a conversation. User B may view an indication of this in display B as well. Further, if user B's speakers enabled on user device B, user B will begin to hear user A speak.

If neither user B nor user A had taken an action within a set period of time, for example, five or ten seconds from user A leaving a page with user B's profile, then their mutual presence will end and their digital representations will disappear from each other's view on the graph display (306).

Figure 4:
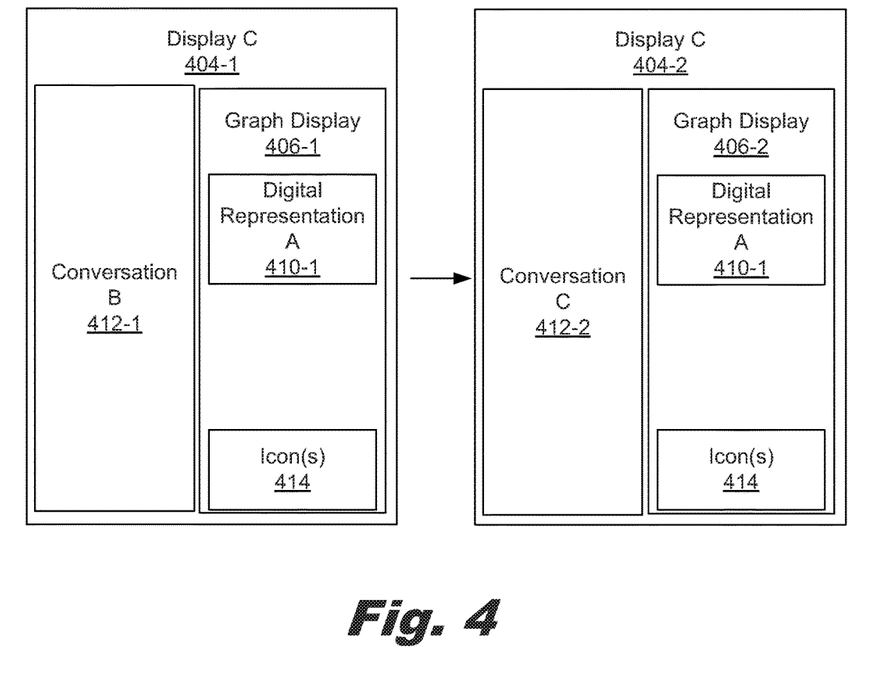
FIG. 4 is an example of a display for displaying a conversation, according to one example of principles described herein.

FIG. 4 is an example of a display for displaying a conversation, according to one example of principles described herein. As will be described below, a group of users may be maintained such that other users may view and/or join a conversation.

As illustrated, display C (404) may be displayed on user device C for user C as described above. As will be described below, display C (404) may display a graph display (406), a number of digital representations (410), icons (414), and conversations (412).

User C views user A's profile card and sees a live video of user A and user B talking with each other as conversation B (412-1). User C remains on mute because user C has not taken an action to initiate a conversation, but if user C's speakers are on and this feature is enabled, depending on user preferences, user C may now hear both user B and user A. In one example, the act of unmoving not only enables the user's microphone on a user device, but sends the current conversation to speaker of the user device. If user B and user A had desired to prevent user C or others from joining in on conversation B (412-1), user B and user A could have initiated conversation B (412-1) in private space. This feature can be limited to those in special groups with each other or networked in a social network, so other users looking at user B and user A's profile cards might still see their normal profile pictures. Further, not all users will be able to immediately join a conversation.

Although not illustrated, user B sees user C's live video in a graph display associated with user B and user C has now joined the group of users by viewing some aspect of the online persona of some member of the group. Further, user A sees a similar view on their graph display.

User C selects user A and user B, bringing them both to the foreground, and takes the conversation with those in the foreground to a private space by clicking on one of the icons (414) such as a pop-out button. Now other users who visit the profile cards for user A or user C or otherwise touch their online personas will either see them in a private space or just see their profile pictures as if they are not in front of the camera. In some examples, some users, particularly those who would immediately see video presence if the users were not in a private space, are given details about who is in the private space and given an opportunity to request to join.

Figure 5:
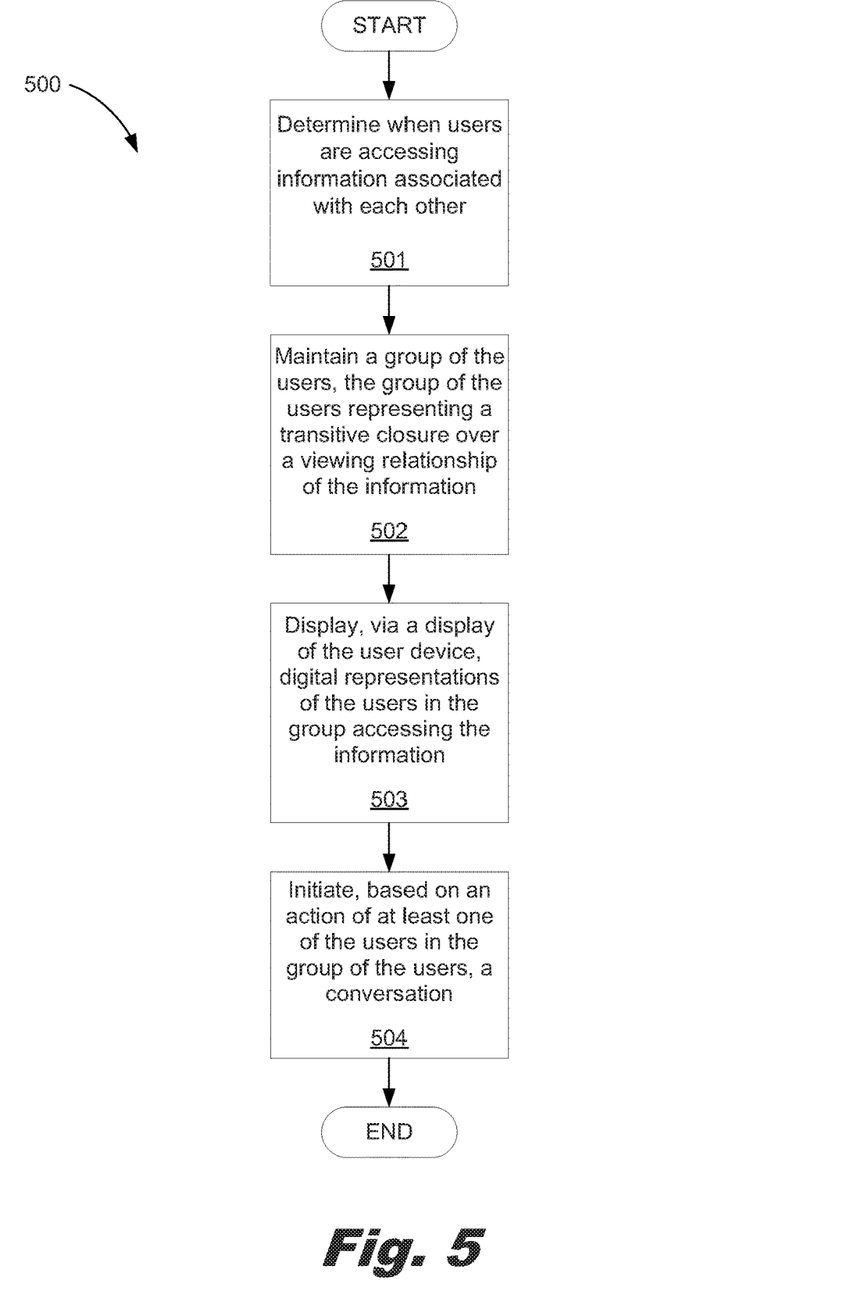
FIG. 5 is a flowchart of an example of a method for forming a group of users for a conversation, according to one example of principles described herein.

FIG. 5 is a flowchart of an example of a method for forming a group of users for a conversation, according to one example of principles described herein. In one example, the method (500) may be executed by the system (100) of FIG. 1. In other examples, the method (500) may be executed by other systems such as system 200, system 700, or system 800. In this example, the method (500) includes determining (501) when users are accessing information associated with each other, maintaining (502) a group of the users, the group of the users representing a transitive closure over a viewing relationship of the information, displaying (503), via a display of the user device, digital representations of the users in the group accessing the information, and initiating (504), based on an action of at least one of the users in the group of the users, a conversation.

As mentioned above, the method (500) includes determining (501) when users are accessing information associated with each other. The information includes a profile associated with at least one of the users, a document associated with at least one of the users, a profile card associated with at least one of the users, or combinations thereof.

As mentioned above, the method (500) includes maintaining (502) a group of the users, the group of the users representing a transitive closure over a viewing relationship of the information. Maintaining (502) a group of the users, the group of the users representing a transitive closure over a viewing relationship of the information includes adjusting the graph data structure based on users accessing information associated with each other, engaging each other in a conversation, or ignoring each other.

As mentioned above, the method (500) includes displaying (503), via a display of the user device, digital representations of the users in the group accessing the information. In some examples, controls are presented alongside a UI. However, the controls are initially minimized in the UI. A user may drag a user's name a short distance across the UI to open a shelf with that user. The user may further drag to bring that user to the foreground of the display.

The addition of other users to the group may occur across a number of applications working together through an operating system. Users may join as they are viewing some user of the group of users in a variety of applications, including a social network, a community, a forum, a blog, or other applications. For example, user A may be looking at the current user's profile in social network X, user B may be looking at the user A's profile in website X and user C may be viewing one of the user in social network Y.

As mentioned above, the method (500) includes initiating (504), based on an action of at least one of the users in the group of the users, a conversation. In some examples, the method (500) may allow at least one of the users in the group of the users to click on a digital representation of another user in the graph display. The action of clicking on the digital representation of another user in the graph display initiates the conversation.

The method (500) may allow the at least one of the users in the group of the users to type a message to another user in the graph display. The action of typing a message initiates the conversation.

The method (500) may allow the at least one of the users in the group of the users to click on an unmute button in the graph display. The action of clicking on the unmute button in the graph display initiates the conversation.

The method (500) may allow the at least one of the users in the group of the users to initiate the conversation via voice command. The action of the voice command initiates the conversation.

The method (500) may allow the at least one of the users in the group of the users to initiate the conversation via eye tracking. A camera my track the eyes of a user. If the method (500) determines a user's eyes are fixed on a digital representation of a user in the graph display for more than a specific amount of time, the method (500) initiates the conversation. The method (500) may allow the at least one of the users in the group of users to speak the name of a member of their group or another audible command to initiate a conversation.

Figure 6:
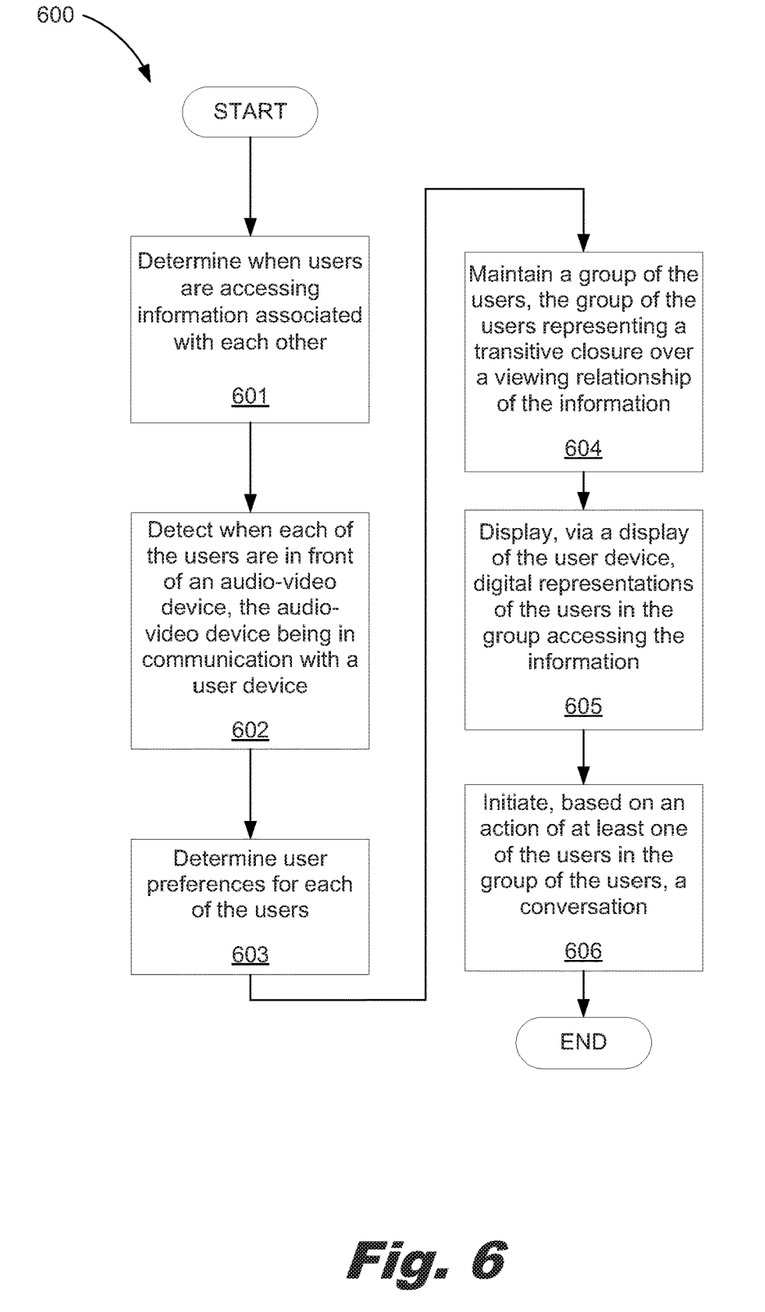
FIG. 6 is a flowchart of an example of a method for forming a group of users for a conversation, according to one example of principles described herein.

FIG. 6 is a flowchart of an example of a method for forming a group of users for a conversation, according to one example of principles described herein. In one example, the method (600) may be executed by the system (100) of FIG. 1. In other examples, the method (600) may be executed by other systems such as system 200, system 700, or system 800. In this example, the method (600) includes determining (601) when users are accessing information associated with each other, detecting (602) when each of the users are in front of an audio-video device, the audio-video device being in communication with a user device, determining (603) user preferences for each of the users, maintaining (604) a group of the users, the group of the users representing a transitive closure over a viewing relationship of the information, displaying (605), via a display of the user device, digital representations of the users in the group accessing the information, and initiating (606), based on an action of at least one of the users in the group of the users, a conversation.

As mentioned above, the method (600) includes detecting (602) when each of the users are in front of an audio-video device, the audio-video device being in communication with a user device. In some examples, methods and techniques may be used to detected when each of the users are in front of an audio-video device. This may be based on perceived movement from the camera's perspective. This may be based on identifying facial features, such as the head, eyes, nose, mouth, of the users. This may include when a microphone detects audio.

As mentioned above, the method (600) includes determining (603) user preferences for each of the users. A UI may be presented to the users to define user preferences. In some examples, the user preferences may be defined at a personal level. As a result, the user preferences may be defined for each user. The user preferences may be defined at a community level. As a result, the user preferences may be defined for all users pertaining to a community. The user preferences may be defined at an organizational level. As a result, the user preferences may be defined for all users pertaining to an organization.

Figure 7:
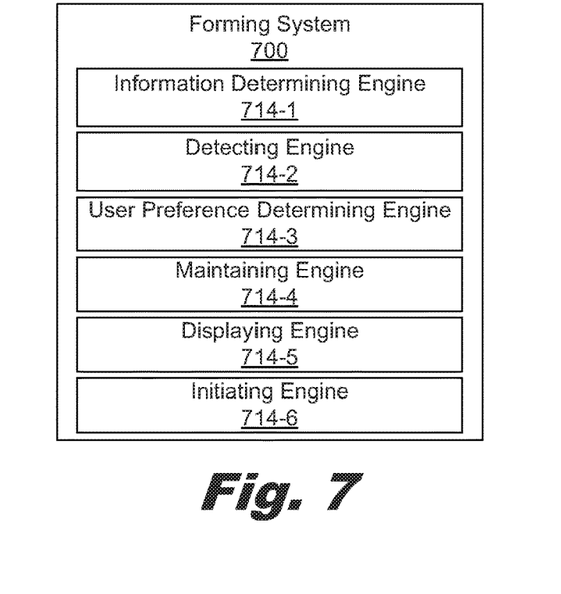
FIG. 7 is a diagram of an example of a forming system, according to the principles described herein.

FIG. 7 is a diagram of a forming system, according to one example of principles described herein. The forming system (700) includes an information determining engine (714-1), a detecting engine (714-2), a user preference determining engine (714-3), a maintaining engine (714-4), a displaying engine (714-5), and an initiating engine (714-6). The engines (714) refer to a combination of hardware and program instructions to perform a designated function. Alternatively, the engines (714) may be implemented in the form of electronic circuitry (e.g., hardware). Each of the engines (714) may include a processor and memory. Alternatively, one processor may execute the designated function of each of the engines (714). The program instructions are stored in the memory and cause the processor to execute the designated function of the engine.

The information determining engine (714-1) determines when users are accessing information associated with each other. The information determining engine (714-1) determines when one user is accessing information associated with another user. The information determining engine (714-1) determines when several users are accessing information associated with several users.

The detecting engine (714-2) detects when each of the users are in front of an audio-video device, the audio-video device being in communication with a user device. The detecting engine (714-2) detects when one of the users is in front of a camera. The detecting engine (714-2) detects when several of the users is in front of the camera. The detecting engine (714-2) detects when one of the users is in front of a microphone.

The user preference determining engine (714-3) determines user preferences for each of the users. The user preference determining engine (714-3) determines user preferences for one of the users. The user preference determining engine (714-3) determines user preferences for several of the users.

The maintaining engine (714-4) maintains a group of the users, the group of the users representing a transitive closure over a viewing relationship of the information. The maintaining engine (714-4) maintains one graph data structure for all of the users.

The displaying engine (714-5) displays, via a display of the user device, digital representations of the users in the group accessing the information. The displaying engine (714-5) displays, via a display of the user device, digital representations of the users in the group accessing the information as one graph display. The displaying engine (714-5) displays, via a display of the user device, digital representations of the users in the group accessing the information as several graph displays.

The initiating engine (714-6) initiates, based on an action of at least one of the users in the group of the users, a conversation. The initiating engine (714-6) initiates, based on the action of at least one user in the group of the users, one conversation. The initiating engine (714-6) initiates, based on the action of at least one user in the group of the users, several conversations.

Figure 8:
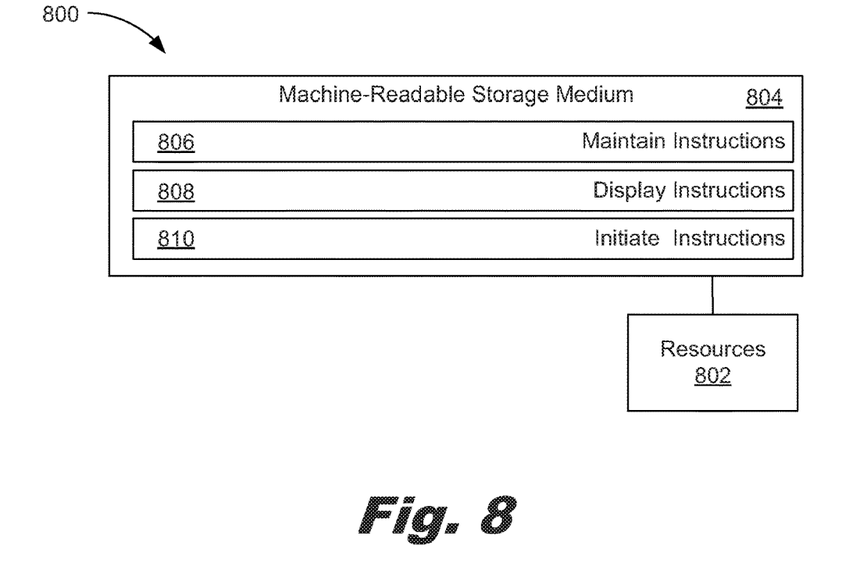
FIG. 8 is a diagram of an example of a forming system, according to the principles described herein.

FIG. 8 is a diagram of a forming system, according to one example of principles described herein. In this example, the forming system (800) includes resource(s) (802) that are in communication with a machine-readable storage medium (804). Resource(s) (802) may include one processor. In another example, the resource(s) (802) may further include at least one processor and other resources used to process instructions. The machine-readable storage medium (804) represents generally any memory capable of storing data such as instructions or data structures used by the forming system (800). The instructions shown stored in the machine-readable storage medium (804) include maintain instructions (806), display instructions (808), and initiate instructions (810).

The machine-readable storage medium (804) contains computer readable program code to cause tasks to be executed by the resource(s) (802). The machine-readable storage medium (804) may be tangible and/or physical storage medium. The machine-readable storage medium (804) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The maintain instructions (806) represents instructions that, when executed, cause the resource(s) (802) to maintain a group of the users, the group of the users representing a transitive closure over a viewing relationship of the information. The display instructions (808) represents instructions that, when executed, cause the resource(s) (802) to display, via a display of a user device, digital representations of users in the group accessing information. The initiate instructions (810) represents instructions that, when executed, cause the resource(s) (802) to initiate, based on an action of at least one of the users in the group of the users, a conversation.

Further, the machine-readable storage medium (804) may be part of an installation package. In response to installing the installation package, the instructions of the machine-readable storage medium (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (802) and the machine-readable storage medium (804) are located within the same physical component, such as a server, or a network component. The machine-readable storage medium (804) may be part of the physical component's main memory, caches, registers, non-volatile memory, or elsewhere in the physical component's memory hierarchy. Alternatively, the machine-readable storage medium (804) may be in communication with the resource(s) (802) over a network. Further, the data structures, such as the libraries, may be accessed from a remote location over a network connection while the programmed instructions are located locally. Thus, the forming system (800) may be implemented on a user device, on a server, on a collection of servers, or combinations thereof.

The forming system (800) of FIG. 8 may be part of a general purpose computer. However, in alternative examples, the forming system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for forming a group of users for a conversation, the method comprising:
   determining when users are accessing information associated with each other;
   maintaining a group of the users, the group of the users representing a transitive closure over a viewing relationship of the information;
   displaying, via a display of a user device, digital representations of the users in the group accessing the information; and
   initiating, based on an action of at least one of the users in the group of the users, a conversation.

2. The method of claim 1, in which the digital representations comprises a live video of each of the users in the group of the users.

3. The method of claim 1, in which the information comprises a profile associated with at least one of the users, a document associated with at least one of the users, a profile card associated with at least one of the users, or combinations thereof.

4. The method of claim 1, in which the viewing relationship of the information for the group of the users is tracked via a graph data structure, the graph data structure comprising nodes and edges.

5. The method of claim 1, in which initiating, based on the action of the at least one user in the group of the users, the conversation comprises initiating the conversation in private space.

6. The method of claim 1, further comprising determining user preferences for each of the users comprising whether conversations should be initiated in private or public space.

7. The method of claim 1, in which the conversation is initiated as an instant message (IM) conversation.

8. The method of claim 1, further comprising detecting when each of the users is in front of an audio-video device, the audio-video device being in communication with the user device.

9. The method of claim 1, in which the digital representations comprises an image or avatar for each of the users in the group of the users.

10. The method of claim 1, in which the conversation is initiated as an electronic mail (email) thread.

11. The method of claim 1, in which the conversation is initiated as a live audio or audiovisual electronic link.

12. A method for forming a group of users for an electronic, online conversation, the method comprising:
    determining when users on a computer network are accessing electronic information associated with each other; and
    in response to a first user accessing information associated with a second user, displaying to the first user a digital representation of the second user with an option to initiate an electronic communication session with the second user.

13. The method of claim 12, further comprising:
    maintaining a group of users that are in a transitive closure formed by links among the grouped users who have, within a limited period of time, accessed information associated with another user in the group;
    displaying on a user device, digital representations of the users in the group; and
    initiating based on an action of at least one of the users in the group of the users, an electronic communication session amongst the group of users.

14. The method of claim 13, further comprising graphing the transitive closure and label edges of the graph indicative of communication that has occurred between users represented in the graph.

15. The method of claim 12, further comprising determining a presence of the second user at a networked computer prior to displaying to the first user the digital representation of the second user.

16. The method of claim 12, further comprising accepting user input specifying the limited period of time.

17. The method of claim 12, wherein the option includes an unmute button that, when actuated, dynamically forms an online venue for the electronic communication and initiates the electronic communication.

18. The method of claim 12, further comprising indicating to the second user that the digital representation of the second user is being displayed to the first user.

19. The method of claim 12, further comprising terminating display of the digital representation of the second user to the first user at a set period of time after the first user stops accessing the information associated with the second user.

20. The method of claim 12, further comprising opening or highlighting a window comprising the digital representation of the second user when a third user enters the group and adding a digital representation of the third user to the window.

* * * * *